(12) United States Patent
Lauber et al.

(10) Patent No.: US 10,752,160 B2
(45) Date of Patent: Aug. 25, 2020

(54) ADJUSTING DEVICE

(71) Applicant: EJOT GmbH & Co. KG, Bad Berleburg (DE)

(72) Inventors: Marcus Lauber, Bad Berleburg (DE); Ralf Peter, Bad Berleburg (DE); Andreas Hentschel, Velbert (DE)

(73) Assignee: EJOT GmbH & Co. KG, Bad Berleburg (DE)

( * ) Notice: Subject to any disclaimer, the term of this patent is extended or adjusted under 35 U.S.C. 154(b) by 0 days.

(21) Appl. No.: 16/346,947

(22) PCT Filed: Oct. 19, 2017

(86) PCT No.: PCT/EP2017/076695
§ 371 (c)(1),
(2) Date: May 2, 2019

(87) PCT Pub. No.: WO2018/086838
PCT Pub. Date: May 17, 2018

(65) Prior Publication Data
US 2020/0055441 A1  Feb. 20, 2020

(30) Foreign Application Priority Data

Nov. 11, 2016 (DE) .......................... 10 2016 222 197

(51) Int. Cl.
*B60Q 1/068* (2006.01)
(52) U.S. Cl.
CPC .................................. *B60Q 1/0683* (2013.01)
(58) Field of Classification Search
None
See application file for complete search history.

(56) References Cited

U.S. PATENT DOCUMENTS 3,678,438 A * 7/1972 Gamson ............... H01R 13/562
    439/445
4,781,629 A * 11/1988 Mize ...................... H01R 11/24
    439/822

(Continued)

FOREIGN PATENT DOCUMENTS

DE      830 717 C      2/1952
DE    1 497 363 A1     6/1969

(Continued)

OTHER PUBLICATIONS

International Preliminary Report on Patentability dated May 23, 2019.

(Continued)

*Primary Examiner* — Ashok Patel
(74) *Attorney, Agent, or Firm* — Wood, Phillips, Katz, Clark & Mortimer

(57) ABSTRACT

An adjusting device (1) for adjusting a position of a headlight, comprising: a holding element (2) for holding the adjusting device (1) at an adjusting screw (10) and a transmission element (3) for changing the position of the headlight depending on the position of the holding element (2) at the adjusting screw (10), wherein the holding element (2) comprises at least two parts (2a, 2b) which are movable relative to one another and which at least partially enclose the cross-sectional area of the adjusting screw (10), and a moving means (4) is arranged at at least one of the at least two parts (2a, 2b), the moving means (4) can be moved such that the at least two parts (2a, 2b) move away from one another in order to arrange the holding element (2) of the adjusting device (1) at the adjusting screw (10), and such that the at least two parts (2a, 2b) move towards one another in order for the at least two parts (2a, 2b) of the holding element (2) to hold the adjusting device (1) at the adjusting (Continued)

screw (10), as well as a headlight with such an adjusting device (1) and a corresponding method.

12 Claims, 2 Drawing Sheets

(56) References Cited

U.S. PATENT DOCUMENTS

| | | | | |
|---|---|---|---|---|
| 5,573,426 A | * | 11/1996 | Grant | H01R 11/24 |
| | | | | 439/504 |
| 5,683,163 A | | 11/1997 | Goldschmidt et al. | |
| 2001/0012738 A1 | * | 8/2001 | Duperret | H01R 11/282 |
| | | | | 439/835 |

FOREIGN PATENT DOCUMENTS

| | | |
|---|---|---|
| DE | 38 41 632 A1 | 6/1989 |
| DE | 198 43 218 A1 | 3/2000 |
| DE | 199 15 632 A1 | 10/2000 |
| FR | 2 707 922 A1 | 1/1995 |
| GB | 1 495 607 A | 12/1977 |
| JP | S60 161212 A | 8/1985 |

OTHER PUBLICATIONS

International Search Report and Written Opinion dated Jan. 18, 2018.
German Search Report dated Nov. 11, 2016.

\* cited by examiner

ADJUSTING DEVICE

This invention concerns an adjusting device for adjusting a position of a headlight, a corresponding headlight and a method of arranging the adjusting device at an adjusting screw.

To ensure that the light cone of a motor vehicle headlight illuminates the road at the correct angle, the headlights comprise an adjusting mechanism. This adjustment mechanism allows the headlight beam to be adjusted either manually or automatically.

An essential part of the adjustment mechanism is the so-called adjusting device. The adjusting device is designed to transmit a movement of an adjusting screw to the headlight. For this purpose, the adjusting device comprises a holding element which causes the adjusting device to move axially along the adjusting screw in one or the other direction by turning the adjusting screw. The adjusting device also comprises a transmission element which transmits the movement to the headlight and thus changes the alignment of the headlight.

The adjustment mechanism should be economical to manufacture, easy to assemble and reliable to operate. In addition, the adjustment mechanism should be universally applicable, i.e. in a large number of different motor vehicles for different types of headlights.

The object of the invention is to provide an adjusting device, a headlight and a corresponding method to realize such an adjustment mechanism.

This object is solved by the subject-matter of the independent claims. Preferred embodiments are given by the dependent claims.

The invention includes an adjusting device for adjusting a position of a headlight. In particular, an element of the headlight is moved in such a way that the position of the light cone of the headlight changes. The adjusting device comprises, inter alia, two elements, a holding element and a transmission element. The holding element is designed to hold the adjusting device at an adjusting screw. The transmission element is designed to change the position of the headlight depending on the position of the holding element at the adjusting screw. The transmission element therefore transmits the movement of the adjusting screw to the headlight. For this purpose, the transmission element is connected directly or indirectly to the headlight. For example, the transmission element can be connected to a reflector or light source of the headlight or to a support frame for the reflector or light source.

According to the invention, the holding element comprises at least two parts. These at least two parts are movable relative to one another. In addition, the at least two parts at least partially enclose the cross-sectional area of the adjusting screw. For example, the holding element may have a c-shaped cross-section which encloses more than half the circumference of the adjusting screw.

According to the present invention, a moving means is arranged at at least one of the two parts, the moving means can be moved so that the at least two parts move away from one another in order to position the holding element of the adjusting device at the adjusting screw. However, the moving means can also be moved so that the at least two parts move towards one another so that the at least two parts of the holding element hold the adjusting device at the adjusting screw. During assembly of the adjusting device, the moving means acts as a lever arm. This means that less force is required during assembly to mount the adjusting device to the adjusting screw.

In particular, this force is less than the force previously required to push the holding element of the adjusting device onto the adjusting screw. This type of assembly also had the disadvantage that the profile at the adjusting screw and the holding element were subjected to high mechanical loads during assembly. In the solution according to the invention, these mechanical loads are considerably lower because the at least two parts of the holding element are moved away from and towards one another with the aid of the moving means. The moving means allows easy and controlled opening and closing of the holding element so that the adjusting device can be placed quickly, accurately and without damaging the adjusting screw. Since the adjusting screw and the adjusting device are no longer subjected to such high forces during assembly, they can also be manufactured more cheaply.

The holding element can be realized in many different ways. Preferably, the holding element is designed in such a way that when the adjusting screw is turned, it moves along the adjusting screw due to the profile arranged at the adjusting screw. The holding element preferably moves in different directions along the adjusting screw depending on the direction of rotation of the adjusting screw. For this purpose, the holding element preferably comprises at least one thread element at at least one of the at least two parts.

The holding element is preferably made of plastic. In addition, the holding element is preferably designed in such a way that the at least two parts can be bent apart, i.e. away from one another, by deforming the holding element. This design of the holding element can also be helpful during the operation of the adjusting device, for example in order to implement a kind of slipping clutch or overload clutch. If a high torque is applied to the adjusting device, for example because the holding element is in contact with a stop of the adjusting screw, the holding element can slide over the profile of the adjusting screw by springing up the holding element without damaging the profile.

According to a preferred embodiment of this invention, the at least two parts of the holding element are connected by a connecting element. Preferably, this connecting element is designed in such a way that, when moving away from or towards one another the at least two parts of the connection element, the connection element changes, while the at least two parts do not change. This connecting element is preferably an element that can be bent with a lower force than the force required to deform the holding element or one of the at least two parts. The connecting element can be designed in different ways. It has essentially the function of a hinge. It can be formed, for example, by the holding element comprising a thinner wall at this point or by the holding element extending only a short distance along the adjusting screw. An example of such a connecting element is a kind of film hinge. But also other elements, which are arranged in the area between the at least two parts and enable the movement of one part relative to the other part, are connecting elements in the sense of the present invention.

Preferably, the adjusting device according to the invention is also designed in such a way that the at least two parts of the holding element cannot move away from one another unintentionally. A securing means is preferably used for this purpose. This securing means can be a part of the adjusting device. However, the securing means may also be a part which is arranged at the adjusting device during assembly of the adjusting device. The securing means is preferably designed in such a way that it prevents the moving means from moving in at least one direction. If the adjusting device comprises a connecting element, the securing means disables the function of the connecting element.

In a further preferred embodiment, the adjusting device comprises two moving means, wherein each moving means is arranged at a respective part of the holding element. The two moving means are designed in such a way that they can be easily used to move the two parts away from one another or towards one another. The two moving means are arranged at the at least two parts in such a way that, by a movement of the two moving means towards one another, the at least two parts are moved away from one another. For example, the two moving means can be designed in such a way that they can easily be pressed together with two fingers to move the at least two parts away from one another.

In a further preferred embodiment, the two moving means are designed such that a securing means can be arranged between the two moving means to prevent movement of the two moving means towards one another.

Preferably, the two outer sides of the moving means, i.e. the two sides each facing away from the other moving means, are designed to be compressed by two fingers or other suitable means. The inner sides of the moving means are preferably designed in such a way that they can receive something which prevents the moving means from moving towards one another.

In another preferred embodiment, the two moving means form at least part of the transmission element. Furthermore, the transmission element with the two moving means is preferably designed in such a way that the transmission element can receive one element of the headlight and this element of the headlight prevents a movement of the two moving means towards one another. For example, the inner sides of the moving means may be arranged to receive an element of the headlight. This has the advantage that when the adjusting device is connected to the headlight, the holding element is automatically secured to the adjusting screw.

In a further preferred embodiment, at least one of the two parts of the holding element comprises at least one alignment aid at one outer end. This at least one alignment aid is designed and arranged in such a way that when the holding element is placed at the adjusting screw, the alignment aid aligns the holding element and thus the entire adjusting device to the profile at the adjusting screw. This ensures that the holding element is properly positioned at the adjusting screw.

The invention also includes a headlight with an adjusting device. The headlight comprises an element that can be connected to the transmission element of the adjusting device in such a way that changing the position of the holding element of the adjusting device at an adjusting screw causes a changing of the position of the headlight.

The invention also comprises a method of arranging an adjusting device in an adjusting mechanism for a headlight. The method comprises, inter alia, the step of moving at least one moving means at one of at least two parts of a holding element of the adjusting device, wherein the at least one moving means is moved such that the at least two parts move away from one another. In the next step, the holding element is arranged at an adjusting screw of the adjusting mechanism. In a further step, the at least one moving means at one of the at least two parts of the holding element of the adjusting device is moved in such a way that the at least two parts move towards one another. Finally, a transmission element of the adjusting device is connected to a headlight in such a way that changing the position of the holding element of the adjusting device at an adjusting screw causes a changing of the position of the headlight.

The invention is explained in more detail below by the embodiment example as shown in the attached drawings. From the embodiment example follow further details, features and advantages of the subject matter of the invention.

Figure 1:
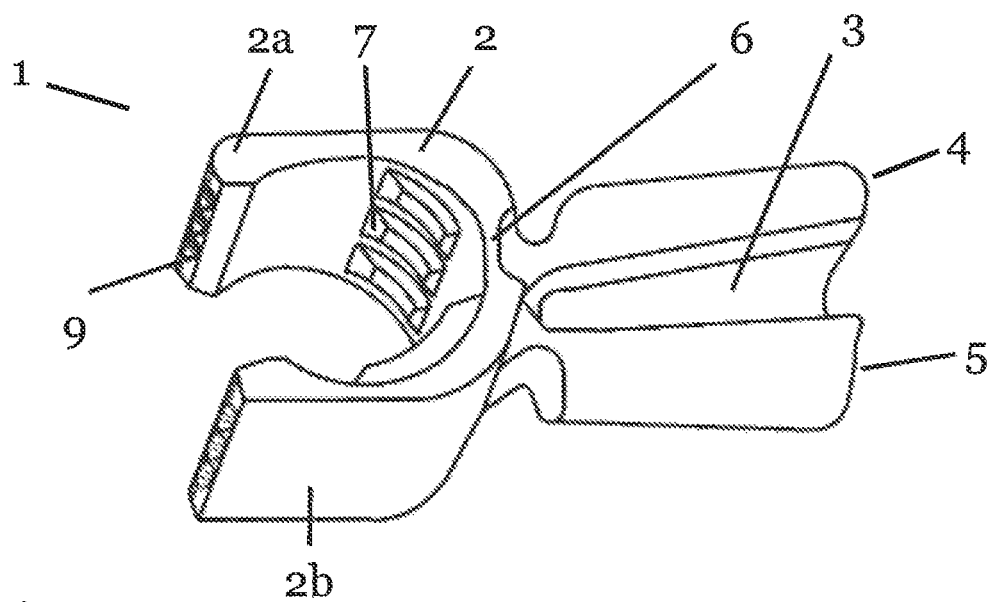
FIG. 1 shows a perspective view of an embodiment of the adjusting device.

FIG. 1 shows a perspective view of an embodiment of the adjusting device 1 according to the invention. The adjusting device 1 comprises a holding element 2 and a transmission element 3. The function of the holding element 2 is to hold the adjusting device 1 at an adjusting screw of an adjusting mechanism. For this purpose, holding element 2 comprises at least two parts 2a, 2b. The embodiment shown in FIG. 1 is an embodiment in which the holding element 2 has exactly two parts 2a, 2b. However, a person skilled in the art knows that the holding element 2 can easily be realized with more than two parts.

The holding element 2 comprises a profile at its inner side, i.e. at the side pointing in the direction of the adjusting screw at which the adjusting device is to be held. This profile causes the holding element 2 and thus also the adjusting device 1 to move axially along the adjusting screw when the adjusting screw is turned. In the case of the embodiment shown in FIG. 1, the profile is formed by thread elements 7.

In the embodiment shown in FIG. 1, the two parts 2a, 2b of holding element 2 are connected to one another by a connecting element 6. The wall thickness of connecting element 6 in this embodiment is lesser than that of the two parts 2a, 2b of the holding element 2. Due to this connecting element, the two parts 2a, 2b can be moved away from and towards one another with considerably less force.

In the present embodiment, the adjusting device 1 comprises two moving means 4, 5. Each of the two moving means 4, 5 is arranged at one of the two parts 2a, 2b of the holding element 2. A movement of the moving means 4, 5 leads to a movement of the part 2a, 2b at which the moving means 4, 5 is arranged. The moving means 4, 5 can have the function of a lever arm.

In the embodiment shown in FIG. 1, the two moving means 4, 5 form a transmission element 3. With the transmission element 3, the movement of the adjusting screw is transmitted to the headlight. For this purpose, the transmission element 3 is designed in such a way that a headlight or part of a headlight, such as a support frame, a reflector or a light source, can be arranged at it.

Figure 2:
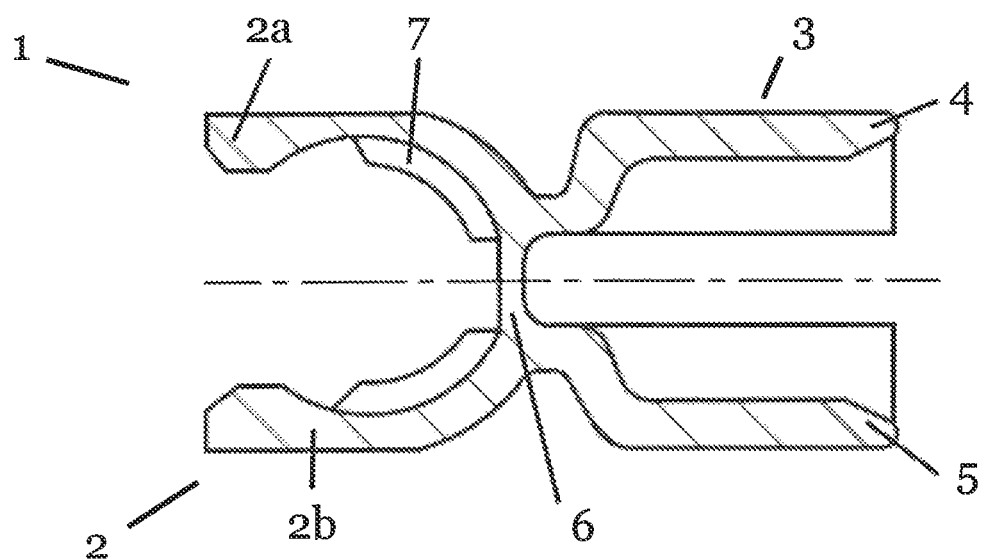
FIG. 2 shows a vertical section through the embodiment of the adjusting device shown in FIG. 1.

FIG. 2 shows a vertical section through the embodiment of the adjusting device 1 shown in FIG. 1. In this view it can be seen in particular that the wall thickness of the connecting element 6 is less than the wall thickness of the two parts 2a, 2b.

The adjusting device 1 in an adjustment mechanism for a headlight can be arranged as follows. According to the invention, at least one moving means 4, 5 is moved first. This moving means 4, 5 is moved relative to the part 2a, 2b of the holding element 2, at which this moving means 4, 5 is not arranged. In the present embodiment, there are two moving means 4, 5, both of which can be moved. In this case, both moving means 4, 5 can be moved towards one another.

Figure 3A:
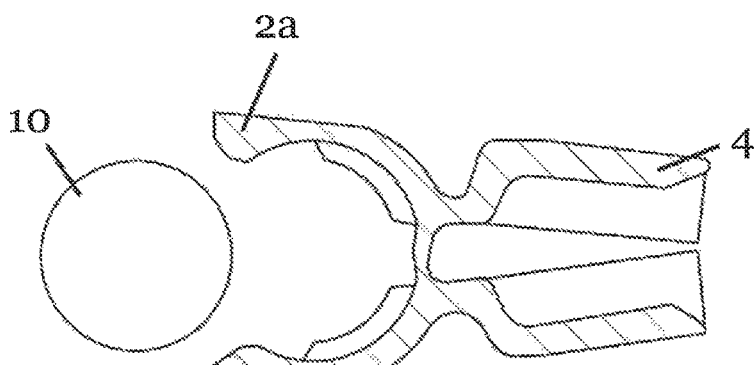
FIGS. 3a-3c show the sequence of assembly of the adjusting device in an adjustment mechanism.
Figure 3B:
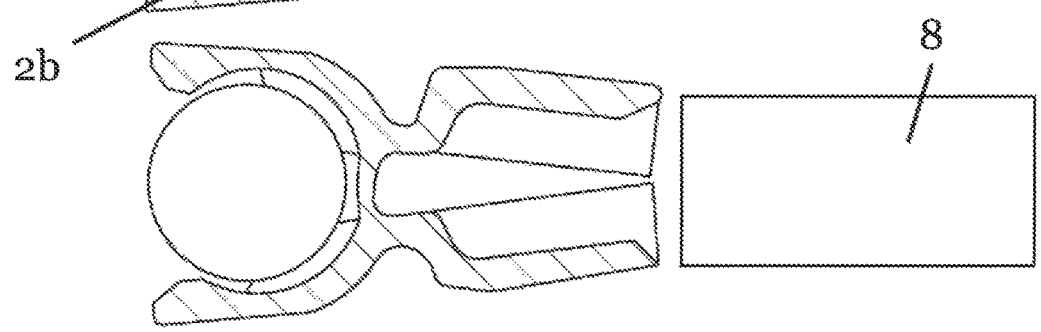
Figure 3C:
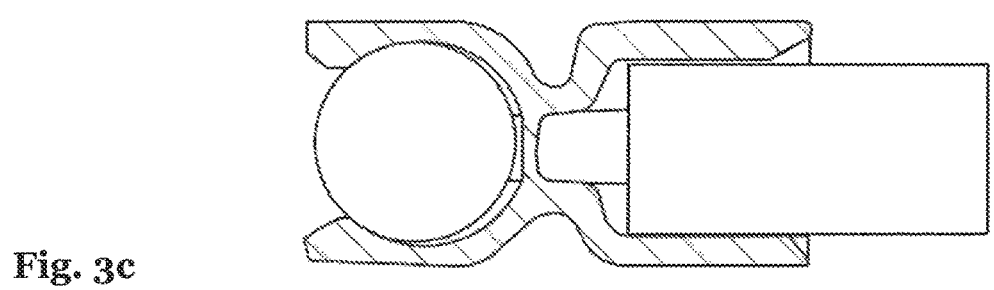

This is illustrated in FIG. 3a. By moving—in this case—the two moving means 4, 5, the two parts 2a, 2b of the holding element are moved away from one another. This allows the adjusting element 1 to be positioned at the adjusting screw to with less mechanical stress. FIG. 3*b* shows the adjusting device 1 with the adjusting screw 10 positioned between the two parts 2*a*, 2*b* of the holding element 2. To prevent the adjusting device 1 from being released from the adjusting screw 10, the two parts 2*a*, 2*b* must be moved towards one another again. It must also be ensured that the two parts 2*a*, 2*b* do not move away from one another again during the operation of adjusting device 1. For this purpose, as shown in FIG. 3*b*, an element 8 of a headlight is placed between the two moving means 4, 5. This element 8 first ensures that the moving means 4, 5 are moved away from one another again, so that the two parts 2*a*, 2*b* of the holding element 2 enclose the adjusting screw to and thus hold the adjusting device 1 at the adjusting screw 10. In addition, element 8 ensures that the two moving means 4, 5 cannot inadvertently move towards one another again during operation, as this would release the adjusting device 1 from the adjusting screw 10.

The embodiment shown in the figures is only an example. The person skilled in the art is aware that the adjusting device 1, the headlight and the corresponding method can also be realized by other means. In particular, the skilled person is aware that at least one moving means 4, 5 does not necessarily have to be part of the transmission element 3. In the context of this invention, the transmission element 3 can also be realised independently of the at least one moving means 4, 5.

The invention claimed is:

1. A position adjustable headlight, comprising:
   an adjusting device having
      a holding element (2) for holding the adjusting device (1) at an adjusting screw (10), and
      a transmission element (3) for changing the position of the headlight depending on the position of the holding element (2) at the adjusting screw (10),
      wherein
        the holding element (2) comprises at least two parts (2*a*, 2*b*) which are movable relative to one another and which at least partially enclose the cross-sectional area of the adjusting screw (10), and
        a moving means (4) secured to at least one of the at least two parts (2*a*, 2*b*), whereby the moving means (4) can be moved such that the at least two parts (2*a*, 2*b*) move away from one another in order to arrange the holding element (2) of the adjusting device (1) at the adjusting screw (10), and such that the at least two parts (2*a*, 2*b*) move towards one another in order for the at least two parts (2*a*, 2*b*) of the holding element (2) to hold the adjusting device (1) to the adjusting screw (10), and
        a headlight element (8) adapted to connect to the transmission element (3) of the adjusting device (1) such that a changing of the position of the holding element (2) of the adjusting device (1) at an adjusting screw (10) causes a changing of the position of the headlight.

2. The headlight according to claim 1, further comprising a connecting element connecting the at least two parts (2*a*, 2*b*) of the holding element (2) to one another.

3. The headlight according to claim 2, wherein the connecting element (6) is a film hinge.

4. The headlight according to claim 1, wherein the holding element (2) comprises at least one thread element (7).

5. The headlight according to claim 1, wherein the adjusting device (1) comprises a securing means which prevents an unintentional movement of the at least one moving means (4) in at least one direction.

6. The headlight adjusting device (1) according to claim 1, wherein the adjusting device (1) comprises two moving means (4, 5), each arranged at a respective one of the at least two parts (2*a*, 2*b*) of the holding element (2), and wherein the two moving means (4, 5) are arranged at the at least two parts (2*a*, 2*b*) in such a way that, by a movement of the two moving means (4, 5) towards each other, the at least two parts (2*a*, 2*b*) are moved away from each other.

7. The headlight according to claim 6, further comprising a securing means between the two moving means (4, 5) adapted to prevent a movement of the two moving means (4, 5) towards each other.

8. The headlight according to claim 6, wherein the two moving means (4, 5) at least partially form the transmission element (3).

9. The headlight according to claim 8, wherein the transmission element (3) is adapted to receive an element (8) of the headlight whereby said headlight element (8) is adapted to prevent movement of the two moving means (4, 5) towards each other.

10. The headlight according to claim 1, wherein the adjusting device (1) is made of plastic.

11. The headlight according to claim 1, wherein at least one alignment aid (9) is secured to at least one of the at least two parts (2*a*, 2*b*).

12. A method for arranging an adjusting device (1) in an adjusting mechanism for a headlight, comprising:
   moving at least one moving means (4) at one of at least two parts (2*a*, 2*b*) of a holding element (2) of the adjusting device (1) such that the at least two parts (2*a*, 2*b*) move away from each other;
   arranging the holding element (2) at an adjusting screw (10) of the adjusting mechanism;
   moving the at least one moving means (4) at one of the at least two parts (2*a*, 2*b*) of the holding element (2) of the adjusting device (1) such that the at least two parts (2*a*, 2*b*) move toward each other; and
   connecting a transmission element (3) of the adjusting device (1) to an element (8) of the headlight such that changing the position of the holding element (2) of the adjusting device (1) at the adjusting screw (10) causes a changing of the position of the headlight.

\* \* \* \* \*